United States Patent [19]
Lillibridge et al.

[11] Patent Number: 5,791,138
[45] Date of Patent: *Aug. 11, 1998

[54] TURBOFAN ENGINE WITH REDUCED NOISE

[75] Inventors: Robert W. Lillibridge, Woodland Hills; Kenneth R. McGuire, Encino; Edward J. Phillips, San Diego; Eugene James Matthews, Encino, all of Calif.

[73] Assignee: Burbank Aeuronautical Corporation II, Burbank, Calif.

[*] Notice: The term of this patent shall not extend beyond the expiration date of Pat. No. 5,706,651.

[21] Appl. No.: 584,342

[22] Filed: Jan. 11, 1996

[51] Int. Cl.$^6$ ................................................ F02K 3/04
[52] U.S. Cl. ................................... 60/262; 60/39.33
[58] Field of Search .................... 60/39.29, 39.33, 60/226.1, 262, 725; 181/213, 220; 415/118, 119

[56] References Cited

U.S. PATENT DOCUMENTS

| | | | |
|---|---|---|---|
| 2,870,633 | 1/1959 | Harding | 415/118 |
| 3,063,661 | 11/1962 | Smith | 60/226.1 |
| 3,696,617 | 10/1972 | Ellis | |
| 4,137,992 | 2/1979 | Herman | |
| 4,292,803 | 10/1981 | Prior | |
| 4,294,069 | 10/1981 | Camp | 60/226.1 |
| 4,401,269 | 8/1983 | Eiler | |
| 4,531,362 | 7/1985 | Barry | 415/119 |
| 4,543,784 | 10/1985 | Kirker | |
| 4,817,756 | 4/1989 | Carr et al. | |
| 4,836,469 | 6/1989 | Wagenfeld | |
| 5,042,245 | 8/1991 | Zickwolf, Jr. | |
| 5,127,602 | 7/1992 | Batey et al. | |
| 5,169,288 | 12/1992 | Gliebe et al. | |
| 5,372,006 | 12/1994 | Lair | |

FOREIGN PATENT DOCUMENTS 2 247 712  3/1992  United Kingdom.

OTHER PUBLICATIONS

Pratt & Whitney Aircraft JT3D Maintenance Manual, "Air—description and operation compressor bleed system," Jul. 15, 1971, p. 5, Aug. 1, 1962, pp. 6–7.

Pratt & Whitney Aircraft JT3D–7 Maintenance Manual, "Engine—description and operation," Nov. 1, 1967, pp. 1–5, 7–21, 48, May 15, 1968, pp. 6.

Pratt & Whitney Aircraft JT8D Engine Manual (PN 481672—Restructured) "Engine General—Description–01," Sep. 1, 1980, p. 1, Oct. 1, 1983, pp. 3, 6, Oct. 1, 1991, pp. 7–8.

(List continued on next page.)

*Primary Examiner*—Louis J. Casaregola
*Attorney, Agent, or Firm*—Merchant, Gould, Smith, Edell, Welter & Schmidt

[57] ABSTRACT

A noise reduction kit for modifying a two (2) spool axial flow turbofan engine with multi-stage compressors and fan driven by multi-stage reaction turbines, and a thrust of at least about 18,000 lbs. at sea level. There is a fan at the upstream end of the core engine for generating axial fan air flow through bypass ducts terminating at a common nozzle, the common nozzle having a mixing plane area for each of the fan air flow and for the exhaust gas in a range between 700 and 800 square inches. A material layer is located in a spacing between a tip of blades for at least some of the fans and a duct for the fans, thereby to reduce a normal clearance between the tip of blades for the fan and the duct. Mixing means for radially diverting fan air and permitting radially outward expansion of exhaust gas is provided coaxially downstream to the core engine. An acoustically dampened light bulb-shaped nose cone is provided for coaxial attachment to an upstream end of the core engine. There is an inlet pressure sensing probe housed in an inlet bullet forwardly of the fans. Alternatively, there is an inlet pressure sensing probe housed at a location of an inlet guide vane forwardly of the fans, the probe being shaped for aerodynamic location in the inlet guide vane. The axial flow front fan is axially separated from the inlet guide vane is extended relatively forwardly.

19 Claims, 3 Drawing Sheets

OTHER PUBLICATIONS

Pratt & Whitney Aircraft JT8D Engine Manual (PN 481672—Restructured) "How to Use," Aug. 1, 1993, p. 28, drawing entitled Noise reduction installation, JT8D, complete print No. SL89AA068; drawing entitled Fan region geometry, detailed comparison for P&W JT80 Engine used on Fedx 727 and DC9–ABS, 1990.

Pratt & Whitney Aircraft Group United Technologies, JT8D–200 Series Commercial Tubofan Engine Installation Handbook, Jul. 1978, Revised: Aug. 16, 1984, p. 1.5, drawing entitled "Fan extended inlet geometry similarites."

Pratt & Whitney (FR–22375) Section 2.0 Engine Description, FAA Spec. Sheet, Jan. 24, 1979, pp. 2–1 to 2–4.

Boeing 707 Intercontinental Maintenance Manual, "Effectivity Turbofan, Compressor Surge Bleed Valve Schedule, Figure 2" Aug. 15, 1975, p. 4.

Douglas Aircraft Co. DC–8 Sixty Series Maintenance Manual, "Cowling—Description and Operation," Aug. 1, 1968, 71–10–0 CODE 2 pp. 1–2; Nov. 1, 1967, 71–10–3, CODE 2, p. 202; Aug. 1, 1967, 71–10–4, CODE 1, p. 203.

Douglas Aircraft Co. DC–8 Sixty Series Maintenance Manual, "Collector—Description and Operation," Aug. 1, 1968, 78–10–0, CODE 2, p. 1; Oct. 1, 1967, 78–10–0, CODE 2, p. 2; Jun. 15, 1969, 78–10–3, CODE 2, pp. 204–206.

Douglas Aircraft Co., Inc. DC–9 Maintenance Manual, drawing entitled "Thrust Reverser Doors—Installation (Figure 201)," Mar. 1, 1977, 78–30–2, CODE 5, p. 202.

McDonnell Douglas Corporation DC–9 Illustrated Parts Catalog, drawing entitled "Series 87 Thrust Reverser Assembly, Figure 25A, (Sheet 1)," Fig. 25A, p. 0, Oct. 1, 1992.

McDonnell Douglas Corporation Super 80 Maintenance Handbook, drawing entitled "Thrust Reverser Door Latches," Nov. 1983, pp. 78–209.

Douglas Aircraft Company McDonnell Douglas Corporation DC–9–80 "Nacelle Stress Analysis vol. III," Jul. 1978, *Functional Description, Nozzle Assy* p. 4.1.1; *Thrust Reverser, General Information* p. 5.0.4; *Thrust Reverser, Structural Description* p. 5.1.1.

Department of Transportation Federal Aviation Administration "Type Certificate Data Sheet No. 1E8," 1E8–17 Pratt & Whitney Aircraft, Turbo Wasp, Jul. 20, 1979, pp. 1–7; Type Certificate Data Sheet, E3EA–6 pp. 1–3; drawing entitled TF33 Engine Specifications; TF33 Overview, Family history—in service beyond 2025; TF33/JT3D Engine Family.

The Boeing Company Report No. NASA CR–1714 entitled "Study and Development of Turbofan Nacelle Modifications to Minimize Fan–Compressor Noise Radiation. Vol. IV—Flightworthy Nacelle Development," Jan. 1971, pp. B00384, B00397–B00447, and B00511–B00532.

Photocopies of 11 photographs of the Boeing Company 707–320C modified engine in 1971.

Douglas Aircraft Company, "Hawaiian Air DC–9 Super 80 System Schematics," Drawing No. 7951806, Size: A, Code Ident. No. 88277, Revised Nov. 5, 1981; and drawing entitled Engine, JT8D–200 Series Engine, Code Ident. No. 88277, Oct. 16, 1980.

Drawing entitled "JT8D–218 for the MD–90 Performance Items," 1983, J27918.25, R831006.

Program on Ground Test of Modified, Quiet, Clean, J3D and JT8D Turbofan Engines in their Respective Nacelles; Unclassified Report No. NAS CR–134553; Boeing Commercial Airplane Company (WA) & National Aeronautics and Space Administration (D.C.), Sep. 1973, pp. entire document.

Pratt & Whitney Aircraft Group, JTD8–200 Installation Handbook, Aug. 1984–Jul. 1978, pp. entire document.

Boeing Commercial Jet Overhaul Manual on the Thrust Reverser Adapter Assembly, Nov. 10, 1977, pp. entire document.

United Technologies Pratt & Whitney, Model Specification, Model JT8D–209 Turbofan Engine Model Specification Guaranteed Calibration Stand Performance, Jan. 10, 1977, pp. 1 & 2.

Boeing Commercial Jet Overhaul Manual on Cascade Installation, 1975–1987, pp. entire document.

Blumenthal, V. L. et al., Aircraft Community Noise Research and Development: A Historical Overview, *J. Acoustical Society of America*, vol. 58, No. 1, Jul. 1975, pp. 124–143.

Brindley, John F., Pratt & Whitney's JT8D–209 Program, Sep. 1978, pp. entire document.

Boeing Commercial Jet Overhaul Manual Thrust Reverser Tailpipe Assembly, Nov. 1975 & Nov. 1984, pp. 1108 & 1109.

Arctander, C. L., et al., Development of Noise–reduction Concepts for 727 and 737 Airplanes, *J. Acoustical Society of America*, vol. 58, No. 1, Jul. 1975, pp. 155–172.

Pratt & Whitney Aircraft JT8D Maintenance Manual, Nov. 1, 1981, p. 613.

Boeing Commercial Jet Overhaul Manual on the Thrust Reverser Installation, Nov. 15, 1968, 1pp.

Boeing Commercial Jet Overhaul Manual on a Forward Seal Assembly, Nov. 10, 1974, p. 503.

Boeing Commercial Jet Overhaul Manual on the Cascade Type Thrust Reverser Installation, May 10, 1982, 1pp.

Boeing Commercial Jet Overhaul Manual on the Thrust Reverser Installation, Figure 1101, May 10, 1975, p. 1102.

Pratt & Whitney JT3D Thrust Reverser Illustrated Parts Catalog, 1967–1976, pp. entire document.

Boeing Commercial Jet Overhaul Manual on the Thrust Reverser Clamshell Door Assembly, May 15, 1969, pp. 12–14.

M. N. Nelson, "Development of Noise Reduction Concepts for the 707 Airplane," *J. of the Acoustical Soc. of America*, vol. 58, No. 1, Jul. 1975, pp. 144–154.

Pratt & Whitney Aircraft United Technologies JT3D–7 "Turbofan engine model specification guaranteed calibration stand performance," May 1, 1964, p. 1.

United Technologies Pratt & Whitney Service Bulletin No. 5613 "Engine—screws, bolts, and rivet pins (cross recess head or rivet pin head)—Replacement of with screws (TCRX recess head)," Aug. 21, 1985, pp. 1–12.

United Technologies Pratt & Whitney Service Bulletin No. 5846 "Engine—fan and turbine exhaust duct assembly (mixer) and fan exhaust outer duct assembly (spacer case) addition of, and first stage fan blade chamfer cut for noise attenuation," Revision No. 1, Apr. 12, 1990, pp. 1–3, 16.

United Technologies Pratt & Whitney Service Bulletin No. 5948 "Engine—case assembly, fan inlet—Extension of to reduce noise, (for DC–9 Aircraft)," Revision No. 2, Nov. 30, 1992, pp. 1–2, 31, 45, 48.

United Technologies Pratt & Whitney Service Bulletin No. 6048 "Engine—screws and rivet pins—optional replacement of with bolts and washers for fan duct fairing attachment," Nov. 7, 1991, pp. 1–9.

Pratt & Whitney Aircraft JT3D Commercial Turbofan Installation Handbook, Section 1, May 6, 1963, pp. 1.0–1.6, drawing entitled "Outline installation drawing–JT3D commerial engine for Boeing," Sep. 25, 1968.

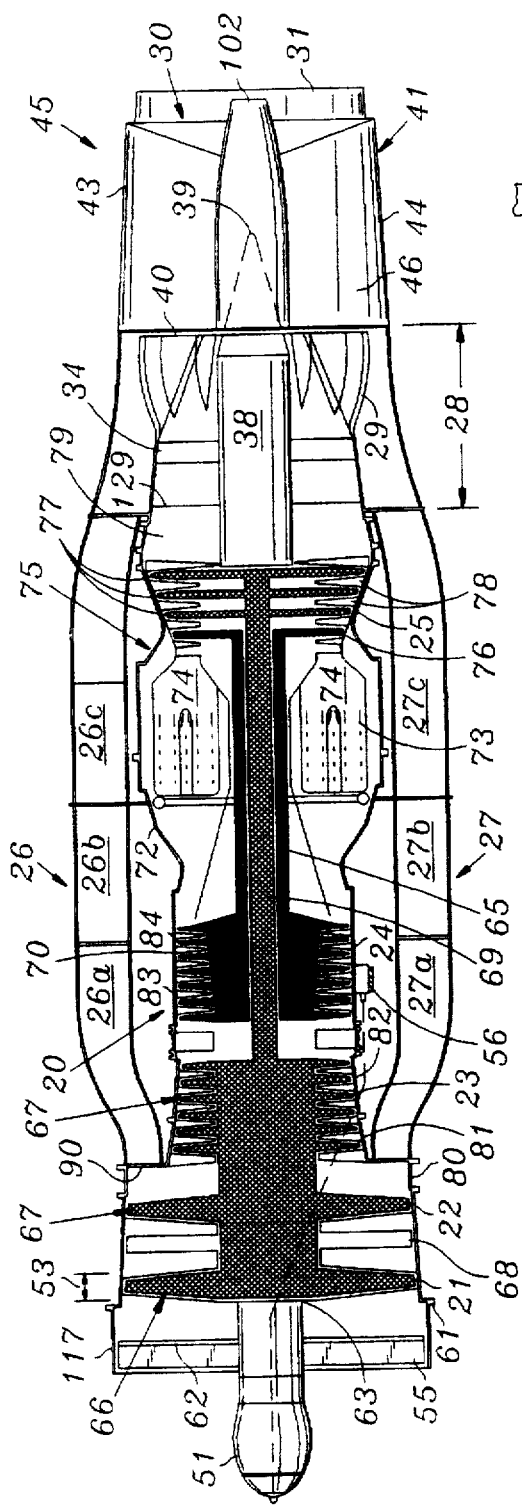
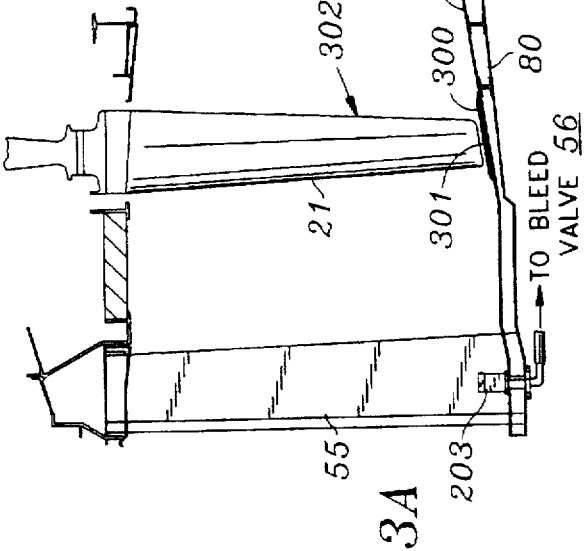
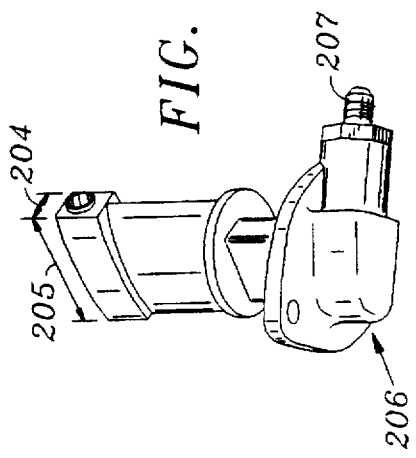
FIG. 3
FIG. 3A
FIG. 3B

5,791,138

1

TURBOFAN ENGINE WITH REDUCED NOISE

RELATED APPLICATION

This invention relates to application Ser. No. 08/521,139, filed Aug. 29, 1995. The contents of that application are incorporated by reference herein.

BACKGROUND

Having a turbofan engine with reduced noise is important.

This invention relates to a turbofan engine for aircraft, the engine having reduced noise. In particular, the invention is concerned with a family of engines originally manufactured by Pratt & Whitney. In particular, these engines include the JT3D-3B, the JT3D-7 and the TF33 Engine, which includes the P-3/103, the P-5, the P-9, the P-100/100A and the P-102/102A Engines ("the JT3D family"). Such engines are commonly used on Boeing 707 aircraft, the Boeing KC135 and E3A aircraft, the Douglas DC8 aircraft and Lockheed C141 aircraft ("Aircraft").

Different techniques and systems are available to quiet an engine to reach different stages of noise reduction as defined by different governmental authorities. In particular, there are hush kits available to quiet Pratt & Whitney JT8D engines commonly used on Boeing 727 aircraft. Such an engine quieting system is the subject of U.S. Pat. No. 5,127,602 ("Batey"). The system uses a spacer and mixer to mix exhaust gas with fan air gas at the rear of the nozzle of the core engine. A cascade-type thrust reverser is used for thrust reverse conditions. Unlike the JT8D family, the JT3D family of engines are designed to exhaust fan air and turbine air separately to ambient air.

In other systems and with other engines, an annular pressure duct is used to direct fan air rearwardly to the rear zone of the exhaust nozzle. Such a system is applied on DC8 Sixty Series aircraft. In these cases, there is no internal mixing in the nozzle area of the exhaust air and duct air at the rear of the core engine. There is no common nozzle.

In some cases, such as the Douglas DC8-62/63 series aircraft and the Lockheed C141 aircraft, the fan air is directed to a plane just upstream of the turbine exhaust nozzle where it ducts to ambient air. In these cases, a common thrust reverser reverses both fan and turbine air. In other cases, such as the Boeing 707, Boeing KC135 and E3A aircraft and Douglas DC8-50/61 series aircraft, the fan air is directed only a short distance and exits to ambient air substantially forward of the turbine exhaust nozzle. In these cases where thrust reversing is desired, separate fan and turbine thrust reversers are required.

Furthermore, these engines have a bleed valve which, in certain situations of low power engine operation, particularly on approach to landing, is opened to bleed air from the core engine away from the thrust generating exit rearwardly of the core engine, perpendicular to the thrust axis of the engine. The opening of the bleed valve relieves very hot supersonic air flow and causes a substantial screeching noise and increases the noise characteristics noticeably in that operative state of the engine.

In the Applicant's experience, there is no system which exists for effectively quieting this JT3D family of engines in a manner to reduce the perceived noise level of the engines, especially low frequency jet mixing noise by at least three (3) noise decibels while maintaining the existing thrust levels.

2

There is a need to provide for the effective operation of such engines under appropriate thrust and operate under the appropriate noise-reduced conditions.

In particular, it is desirable to provide a turbofan engine with reduced noise and to provide a hush kit for retrofitting such engines which minimizes the disadvantages of known systems.

SUMMARY

By this invention there is provided a turbojet engine with reduced noise and a hush kit system for retrofitting an engine and creating a quieter engine which has advantages over known hush kit systems.

According to the invention, there is provided a noise-reduced turbofan engine comprising a core engine having two (2) spool axial flow fans, multi-stage compressors and multi-stage reaction turbines and a thrust of at least about 18,000 lbs. at sea level. These engines include the JT3D-3B, the JT3D-7, and TF33, which includes the P-3/103, the P-5, the P-9, the P-100/100A and the P-102/102A engines produced by Pratt & Whitney, East Hartford, Conn., having a thrust preferably between about 18,000 lbs and about 21,000 lbs. at sea level.

The fans are at an upstream end of the core engine for generating axial fan air flow. There are bypass ducts for receiving a major portion of the axial fan air flow from the fans. The ducts terminate at a common nozzle located at the outlet for exhaust gas from the engine.

The common nozzle has a mixing plane area for each of the fan air flow and for the exhaust gas, each in a range between 700 and 800 square inches. There is a mixer in the common nozzle assembly disposed axially to receive and exhaust the exhaust gas and fan air from the common nozzle to the tail pipe assembly. The plane area for the fan air is preferably in the range of about 750 to 780 square inches, and more preferably about 752 square inches.

An annular mixer adapter is provided for fixing the mixer to a casing for the core engine in a position downstream of and coaxial with the core engine.

A material layer is located in a spacing between a tip of blades for at least some of the fans and a duct for the fans, thereby to reduce a normal clearance between the tip of blades for the fan and the duct.

An acoustically dampened light bulb-shaped nose cone is provided for coaxial attachment to an upstream end of the core engine. The acoustically dampened nose cone, also known as an inlet centerbody, is provided for coaxial attachment to an upstream end of the core engine. The nose cone is light bulb-shaped. An inlet cowling, more preferably about 40" to 48" in length, is provided with a leading edge which is heated by engine bleed air for anti-icing with an acoustic liner comprising the inner air flow walls.

There is an inlet pressure sensing probe housed in an inlet bullet forwardly of the fans. Alternatively, there is an inlet pressure sensing probe housed at a location of an inlet guide vane forwardly of the fans, the probe being shaped for aerodynamic location in the inlet guide vane. The axial flow front fan is axially separated from the inlet guide vane is extended relatively forwardly.

The axial flow front fan is axially separated by a spacer, preferably about 3" to 5", an amount equal approximately to the axial depth of the blades of the fans. The inlet guide vanes, which direct inlet air to the first row of fan blades, is moved to a position, preferably in the range of 3" to 5" forward of its present location, and a new engine hub and oil-damped bearing installed.

The tail pipe assembly is also configured to have a relatively greater cross-sectional area in the exit for accommodating an increased volume in the flow stream leading from the common nozzle. The greater cross-sectional area is relative to the turbine exhaust area of an unmodified JT3D family of engines. The tail pipe exit plane is extended, to allow for mixing of the fan and turbine flows internally.

The invention further includes a method of modifying an engine as defined to reduce noise with the kit. Bypass ducts, some of which may have acoustical liners, are installed for receiving at least a portion of the axial fan air flow from the fans. The ducts terminate at a common nozzle located at the outlet for exhaust gas from the engine through bypass ducts terminating at a common nozzle.

A mixer is installed forward of a tail pipe assembly disposed axially to receive and exhaust the exhaust gas and fan air from the common nozzle. The mixer is installed coaxially downstream to the core engine for radially diverting fan air and permitting radially outward expansion of exhaust gas to mix the fan air and exhaust gas.

An annular exhaust common nozzle is installed coaxially, between the downstream end of the core engine and a thrust reverser. The common nozzle extends the axial flow path of the mixed exhaust gas and fan air upstream of the reverser.

The invention is further described with reference to the accompanying drawings.

DRAWINGS

FIG. 3 is a sectional top view of the core engine and sectional views of the duct to the common nozzle area of the mixer, and the reverser is closed, and showing one embodiment where the inlet probe for atmospheric air is in the bullet of the nose piece.

FIG. 3A is a detailed sectional top view of the inlet duct to the fan of the core engine, showing an inlet probe at the inlet for atmospheric air for a valve, and also an ablated space in relation to the fan.

FIG. 3B is a perspective view of the inlet probe for atmospheric air for a valve operating with the core engine.

DESCRIPTION

Figure 1:
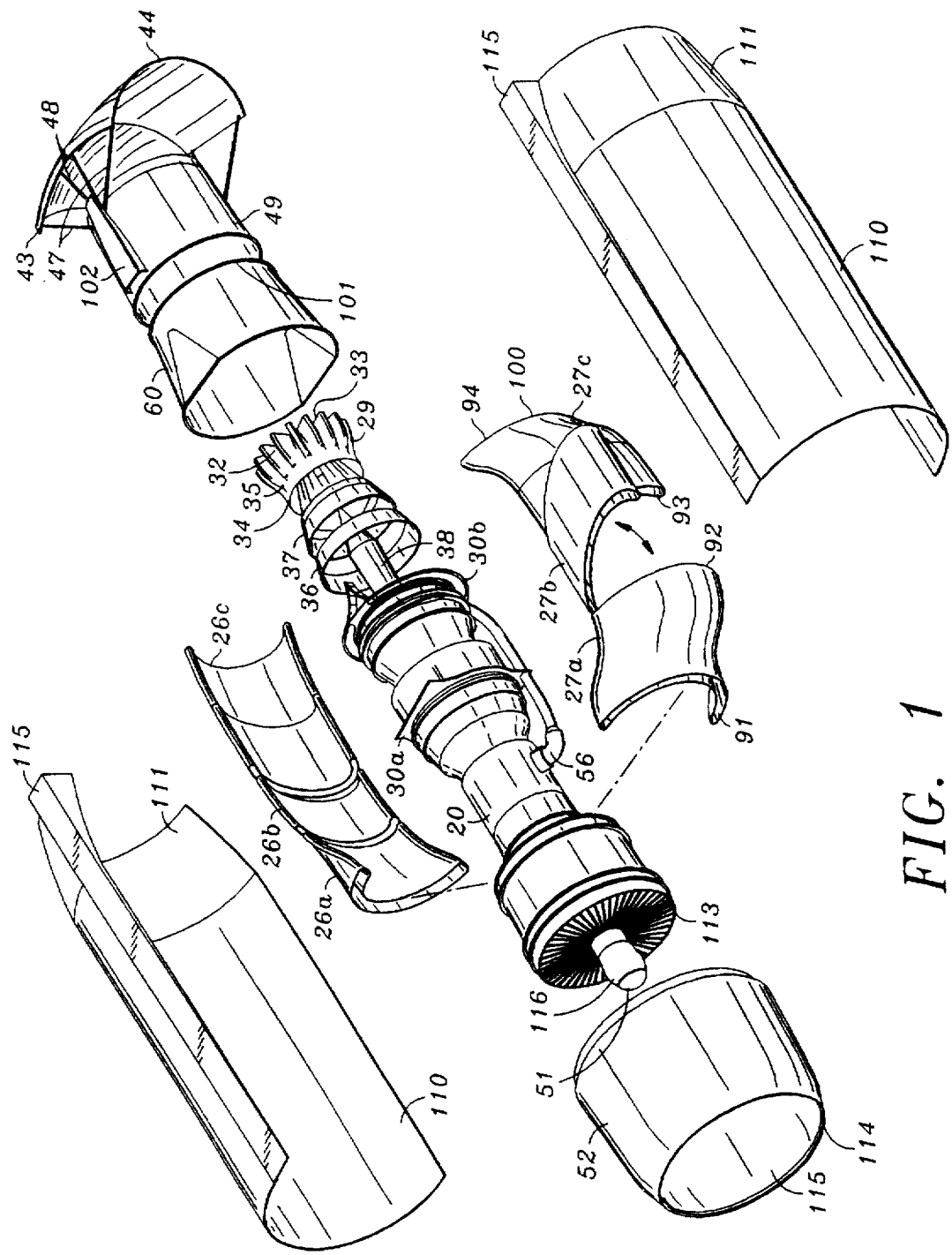
FIG. 1 is an exploded perspective top view of the components making up the core engine, and the hush kit.
Figure 2:
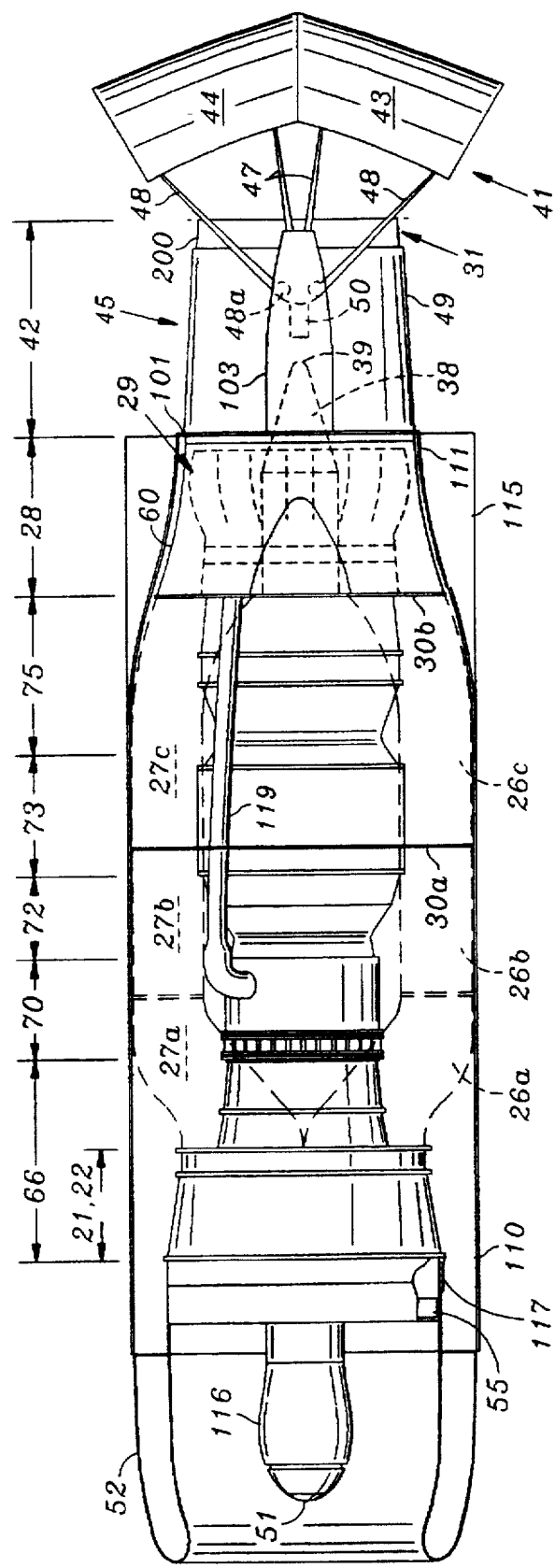
FIG. 2 is a bottom view of the core engine, with some hush kit components and the cowling shown in phantom, and the reverser is open.

A JT3D or TF33 core engine, as modified, is described as set forth below:

I. ENGINE AND HUSH KIT GENERALLY
A. Engine

A noise-reduced turbofan of the JT3D family of engines comprises a core engine 20 having two spool axial flow fans 21 and 22, multi-stage compressors 23, 24 and 25 and multi-stage reaction turbines and a thrust of at least about 18,000 lbs. at sea level. More specifically, the generated thrust is 18,000 to 21,000 lbs. take-off power at sea level on a standard day. The family of JT3D engines manufactured by Pratt & Whitney consists of the JT3D-3B, the JT3D-7 and the TF33 engine, which includes the P-3/103, the P-5, the P-9 and the P-102/102A engines. The JT3D family of engines is commonly used on Boeing 707, the Boeing KC135 and E3A aircraft, Douglas DC8 series aircraft, and Lockheed C141 aircraft ("Aircraft").

The fans 21 and 22 of the engine are located at an upstream end of the core engine for generating axial fan air flow. There are two bypass ducts 26 and 27 on each side of the engine 20 for receiving at least a portion of the axial fan air flow from the fans 21 and 22. The ducts 26 and 27 collectively surround the core engine 20 and terminate at a common nozzle 28 located at the outlet 29 for exhaust gas from the engine 20. Each of the bypass-ducts 26 and 27 is composed of three separable sections 26a, 26b and 26c; and 27a, 27b and 27c on each side from the front to the rear of the core engine 20. The ducts 26 and 27 are removable, in part or whole, as necessary when the core engine 20 needs maintenance. There are two spaced fire walls 30a and 30b located transversely of and about the engine 20.

There is a mixer 29 in the common nozzle 28 which is upstream of a tail pipe assembly generally shown as 42. The tail pipe assembly 42 includes multiple components to axially receive and exhaust the exhaust gas and fan air from the common nozzle 28 to the exit nozzle 31.

The common nozzle 28 has a mixing plane area for each of the fan air flow and for the exhaust gas. Each plane is in a range between 700 and 800 square inches.

The plane area for the fan air 32 is formed effectively by the area of the lobes of the mixer 29 receiving the cold fan air, and is in the range of about 750 to 780 square inches, and is preferably about 752 square inches. The plane area for the exhaust gas 33 is formed by the lobes of the mixer 29 for receiving the hot gas, and is about 725 to 760 square inches, and preferably about 727 square inches. The plane area of the common nozzle 28, as defined by both these plane areas 40, is 1,482 square inches. The diameter 31 of the exit nozzle 200 is preferably between about 37 inches to 39 inches, and more preferably, 38.88 inches. The mix of fan air and hot gas is about 80%.

The mixer 29 has an annular mixer wall 35 axially extending downstream therefrom. The wall 35 is formed into a plurality of circumferentially alternating radially inward and radially outward lobes 32 and 33, respectively. The radially inward lobes 32 define cold chutes for radially inwardly diverting fan air. The outwardly directed lobes 33 define hot chutes to permit radially outward expansion of exhaust. The particular JT3D family of engines can have different numbers of lobes in the mixer, preferably having 14 to 18 lobes. The JT3D family of engines preferably has a 16-lobe mixer. A JT8D-200 model engine uses a 12-lobe mixer.

An annular mixer adapter 36 is provided for fixing the mixer to the exhaust outlet 129 for the core engine in a position downstream of, and coaxial with, the core engine 20.

A mixer transition contour plate is provided 34 for coaxial attachment to the downstream end of the transition contour plate 37 of the core engine 20. There is an annular, axially extending transition contour plate 37 for attachment to the upstream end of 34. The plates are shaped to aerodynamically conform to the mixer to direct fan air. This is different to and additional to the mixer adapter 36 which fits within the contour plate 37.

The rear portion of the core engine 20 includes an aft center body 38. This is extended to project into the mixer 29 and the end of 39 projects beyond the aft end 40 of the mixer 29.

A target-type thrust reverser 41 is provided to be movable into a first position for converting axial flow of exhaust gas and fan air from the tail pipe assembly 42 into reverse thrust. It is movable into a second stowed position which permits the reverser doors 43 and 44 to act as aerodynamic fairings for the nacelle afterbody 45.

The target-type thrust reverser system 41 has opposing doors 43 and 44 rotatable into a position to block and divert the flow of exhaust gases from a nozzle assembly 46 of the common nozzle 28 by means of a mechanical driver linkage 47 and roller linkage 48 to an hydraulic actuation system 50. There is an acoustic liner for nozzle assembly 46 that serves as the exhaust duct section of the engine nacelle package and consists structurally of a welded sandwich barrel tail pipe 49 having the inner face perforated for noise abatement. This barrel tail pipe 49 provides support for the thrust reverser generally indicated as 41.

An acoustically dampened nose cone 51 is provided for coaxial attachment to an upstream end of the core engine 20. The nose cone 51 is light bulb-shaped.

A material layer 300 is located in a spacing between a tip 301 of blades 302 for at least some of the fans and a duct for the fans, thereby to reduce a normal clearance between the tip 301 of blades 302 for the fan 21 and the duct. The layer 300 is a plasma spray layer located about the inside wall 303 of the duct, and is located about the inside wall 303 of the duct to a thickness of between about 0.050 to about 0.090 of an inch. This ablation layer reduces the space between the blade tip 301 and the inside wall of the duct and thereby reduces the amount of noise generated by the core engine. The data indicates that this reduction is in the order of about 4 decibels. Different thicknesses, either greater or less, can be used as required.

An inlet cowling 52 has a relatively increased diameter inlet cowling relative to an unmodified engine where blow-in doors are presently used.

The axial flow fan blades 21 and 22 are axially separated by an amount equal approximately to the axial depth 53 of the fan blades 21 and 22. The inlet guide vane 55 for the front fan 21 is moved forward of its present position, preferably in the range of about 3" to about 6", and preferably about 5", and a new engine hub and damped bearing installed. This is termed a "Respaced Inlet Guide Vane" ["RIGV"].

The acoustically dampened light bulb-shaped nose cone is provided for coaxial attachment to an upstream end of the core engine. The acoustically dampened nose cone, also known as an inlet centerbody, is provided for coaxial attachment to an upstream end of the core engine. An inlet cowling, more preferably about 40" to 48" in length, is provided with a leading edge which is heated by engine bleed air for anti-icing with an acoustic liner comprising the inner air flow walls.

There is an inlet pressure sensing probe housed in an inlet bullet forwardly of the fans. Alternatively, there is an inlet pressure sensing probe housed at a location of an inlet guide vane forwardly of the fans, the probe being shaped for aerodynamic location in the inlet guide vane. The axial flow front fan is axially separated from the inlet guide vane is extended relatively forwardly.

The tail pipe assembly 42 including nozzle 31 is configured to have a greater cross-sectional area in the exit for accommodating an increased volume in the flow stream from the common nozzle 28.

A bleed air valve from the core engine 20 is selectively operational to bleed air from the core engine 20 when the valve is open. There is a duct 56 for directing bleed air into the common nozzle 28. The duct 56 for the bleed air runs parallel to and adjacent to one of the ducts 26 or 27 for the fan air. It ends at the common nozzle 28 and particularly through a port provided in the fire wall 30b adjacent to the area of the common nozzle 28.

B. Noise Suppression Hush Kit

The major components for the hush kit for the JT3D family of engines are set forth below.

The elements of the noise suppression kit are sized to fit a two-spool axial flow, turbofan engine with multi-stage compressors and fans driven by multi-stage reaction turbines designed for operation with fixed area nozzles for primary and fan discharge.

The components are:

1. Fan Air Ducts—3 components on each of two sides of the Core Engine.
2. Common Nozzle—This new component to the JT3D family of engines is for a Nozzle for the primary (exhaust) gas and for the fan air discharge.
3. Mixer to assist the Common Nozzle.
4. Mixer adapter: This is a Spacer or Transition Ring.
5. Mixer Transition Contour Plate. This is a fairing, namely a Fan Exhaust Duct Segment.
6. Bleed Valve Duct terminating into the Common Nozzle.
7. Common Nozzle Duct Assembly for installation of the Thrust Reverser. This has a Thrust Reverser Mounting Ring or Adapter.
8. Target-Type Reverser.
9. Acoustic Nozzle Assemblies.
10. Acoustically treated, lengthened and diametrically enlarged Nose Cowl with no blow in doors for those Aircraft that originally were designed with Nose Cowls having blow-in doors.
11. Acoustically treated, lengthened Center Body: Bullet—light bulb shape
12. Respaced Inlet Guide Vane (RIGV).
13. Cowl doors—Apron.

II. CORE ENGINE

The core engine or power plant of the JT3D family of engines is a two-spool axial flow turbofan engine with multi-stage compressors and fans driven by multi-stage reaction turbines.

A. Description And Operation

1. General

The JT3D family of engines is made up of engines which operate similarly to all turbofan versions of a gas turbine engine. Two front compressor stages 21 and 22, respectively, have vanes and blades which are considerably larger than other stages and are commonly referred to as a "fan". This "fan" provides two separate air streams.

A primary, or inner air stream travels through the engine 20 and the internal devices operate to generate pressures and gases in the exhaust nozzle 46 and thereby provide propulsive force. This stream is the exhaust stream. Secondary, or outer air stream is mechanically compressed by the "fan" as it enters the engine and is normally ducted to the outside engine 20 a short distance from "fan". This secondary air stream, termed the "fan air", adds to propulsive force similar to a propeller. Although the "fan" has an effect of a geared propeller, it is driven at engine speed. The efficiency of the engine is increased by the dual air streams, and since a smaller percentage of available energy is diverted to the "fan", thrust-specific fuel consumption is lower than that of comparable turboprop engines.

The JT3D family of engines consists of axial flow turbofan engines having a fifteen to sixteen-stage split compressor, an eight-can combustion chamber, and a four-stage split turbine. With all the engine-provided accessory components installed (aircraft component mounting brackets excepted), each of the engines of the JT3D family of engines weighs approximately 4,260 to 4,900 pounds.

2. Operation

Air enters the engine 20 through the compressor inlet case assembly. The airframe inlet duct is attached to the front of the inlet case. This inlet case assembly 61 is provided with vane-type multi-purpose struts 62 which transmit No. 1 bearing 63 loads to the outer case structure, conduct anti-icing air and lubricating oil to the inner diameter of the engine, and direct air to the front compressor section.

3. Compressor Section

The compressor section is of split-type and consists of two rotor assemblies 69 and 65, respectively. Each rotor assembly 69 and 65 is driven by an independent turbine, and each rotor 69 and 65 is free to rotate at its best speed. Since it is necessary to rotate only one of these units during starting operation, selection of a small rear compressor permits use of a smaller starter.

Air from the inlet guide vane 55 and shroud assembly enters the front compressor 66, which consists of eight rotor stages 67 and seven stage stator vanes 81. The gas path of this compressor has a constant inside diameter and decreasing outside diameter. This compressor is the larger of two, and provides initial compression of air. Rotating parts are connected by a drive shaft 69 which passes through the inside of the rear compressor rotor 65 and drive shaft to second and third stage turbines.

Between the front compressor 66 and rear compressor 70 is an intermediate case. It directs compressed air from the front compressor 66 to the rear compressor 70.

The rear compressor 70 has seven rotor stages 84 and six vane stages 83. It has a constant outside diameter and increasing inside diameter, and is driven by a first stage turbine through an independent shaft concentric with the front compressor drive shaft. Aft of the rear compressor 70 is a diffuser case 72.

The compressor exit guide vanes at the front of the diffuser case 72 straighten air which is then expanded for entry into combustion chambers 73.

The fuel manifold, which consists of eight circular clusters of six fuel nozzles, is located in the diffuser case 72 annulus and injects fuel into the air stream in governed proportions. At this point, the air is channeled into eight portions for burning with fuel in eight combustion chambers 73 and 74.

4. Combustion Section

The combustion section consists of eight separate cans arranged annularly, namely the "cannular burners". The chambers 73, as viewed from the rear of the engine.

5. Turbine And Exhaust

The turbine nozzle case 75 houses the first three stages of a four-stage turbine and is aft of the combustion section 73. The first stage 76 drives the rear compressor 70, and the second, third, and fourth stages 77 drive the front compressor 66. The turbine nozzle case 75 also contains four turbine exhaust nozzles. The nozzles are made up of a series of stationary vanes 78 which direct exhaust gases through turbine blades and into the turbine exhaust case.

To the rear of the turbine nozzle case 75 there is a turbine exhaust case 79 which houses a fourth stage turbine disk and blades and through which exhaust gases are ejected from the engine. The turbine exhaust case 79 also supports the No. 6 bearing and the No. 6 bearing oil sump.

B. Front Compressor Section

1. Front Compressor Assembly

The front compressor, which is housed in the front compressor front and rear cases, consists of a rotor composed of eight rows of blades 67 and a stator assembly containing eight rows of vane 81 and shroud assemblies located between successive stages of blades. The first two rows of blades 67 are considerably larger than the rest and are referred to as "fan" blades 21 and 22.

The compressor is driven by the shaft 69 from the second, third, and fourth stage turbines. Its rotational speed is roughly two-thirds the speed of the rear or high-speed compressor 70. Its function is to provide initial compression to air that passes through the engine 20 and transmits this air to the rear or high-speed compressor 70. Stator vanes 68 and rotor blades 67 diminish in size and increase in quantity from the front to the rear of compressor. This matches decreasing volume of air as the pressure of air rises.

The inlet case assembly consists of hollow titanium vanes 55, incorporating foam rubber stiffeners in center bays, that are inserted between hollow, double-walled titanium inner and outer shrouds. Each vane 55 extends from the inner wall of the inner shroud to the outer wall of the outer shroud. Also, vanes 55 are welded to the outer wall of each shroud. There are holes in the side walls of the vanes 55 that are between the shroud walls, and this forms passage for the flow of anti-icing air.

2. Front Compressor Cases

There are three front compressor cases, namely: the front compressor case and vane assembly 61, the fan discharge case assembly 80, and the compressor rear case assembly 82. The front compressor case 80, 61 and 82 carry structural load from the engine. These cases 80, 61 and 82 decrease in diameter from front to rear to match decreasing diameters of stator rings.

a. Front Compressor Case and Vane Assembly

The front compressor case and vane assembly 80 attaches to the rear flange of the compressor inlet case 61 and front flange of the fan discharge case 81. In the approximate center of the case, riveted to internal flanges, are titanium first stage stator vanes. At the inner shroud of vanes, an aluminum stage air sealing ring is riveted. The inner shroud is constructed of titanium. From the forward internal flange to the inlet case, the front airflow duct is inserted. From the rearward internal flange to the fan discharge case forward flange, the rear airflow duct is inserted.

b. Fan Discharge Case Assembly

Attached to the rear flange from the compressor case, and further attached to the vane assembly by bolts and pinned to the rear airflow duct, is the fan discharge case 80.

c. Front Compressor Rear Case Assembly

Attached to the rear innermost flange of the fan discharge case and to the forward flange of the intermediate case is the compressor rear case assembly 82. Welded to it internally are supports for the vane and shroud assemblies.

3. Front Compressor Stator Vanes and Shrouds

The first stage stator vanes 68 were discussed above under the front compressor case and vane assembly. There is no second stage stator. The third and fourth stage rows, or statuaries, are made of aluminum. These vanes 68 are riveted into aluminum shroud rings. The fifth through eighth stator vanes 68 are made of stainless steel and are welded into steel shroud rings. All shroud rings are wide enough to form spacers which permit compressor blades 67 to rotate.

The angle at which vanes 68 are mounted in shrouds is set to feed air into the following row of rotor blades 67 to give the best compressor efficiency at operating speed. Stator vanes 68 decrease in size from front to rear to match the decreasing volume air and decreasing size of the rotor blades 67.

4. Front Compressor Rotor

The front compressor rotor 66 consists of two hubs, seven disks, seven spacer assemblies, eight rows of blades 67, two sets (sixteen each) of tie rods and associated hardware. Each row of blades 66 is inserted into undercut slots in its disk. They are held in place by locks inserted under blades 66 and bent to secure. The blades 66 do not have a tight fit, but rather are seated by centrifugal force during engine operation. The front hub forms the disk for the first row of blades 66, but the rear hub is a separate unit that is held fast to the rearward face of the seventh stage disk by tiebolts. Spacers between the disks are internally reinforced with tubes.

Rotor blades 67 decrease in size from front to rear. The first two stages of blades 66 are considerably larger than the rest and form the fan stages 21 and 22. The angle of each row of blades 66 is set to give best efficiency at operating speed. The rear hub flange has large holes to allow some ninth stage air into the compressor rotor. This air serves the dual purpose of providing bearing seal pressurizing and cooling.

C. Compressor Intermediate Section

Forward mounting points are on an intermediate case 70 which is attached to the rear flange of the front compressor case 82. A locating pin is used at the top center between the two flanges. An intermediate case 70 surrounds the rear compressor, but is not considered as part of it. It serves to separate low pressure from the compressor from high pressure in the rear compressor 72 and serves a structural function of joining external cases. The intermediate case 70 is of steel construction and has a double wall on the forward end. The guide vanes are welded from the outer wall, through the inner wall and extend into the shroud ring. The front flange of the case is drilled and tapped for bolts that attach it to the front compressor case 82, and the rear flange is drilled. Nuts are spun into holes for bolting the diffuser case 72 and the intermediate case 70 together.

D. Rear Compressor Section

The rear, or high, compressor 70 is driven by a hollow shaft 65 from the front stage of turbine 76. Its function is to compress further air delivered by the front compressor and then feed this air into the diffuser case 72 and burners 74.

The rear compressor 70 consists of a stator having six rows of vanes 83 and a rotor shaft 65 having seven rows of blades 84. Exit guide vanes are mounted in the diffuser section 72.

1. Vane and Shroud Assemblies

There are six vane and shroud assemblies 83 in the rear compressor 70. The vanes 83 reduce in height from the front to the rear of the compressor 70. The outer side diameter of the air passage formed by these assemblies is constant, decreasing size of the vanes 83 is accomplished by increasing the diameter of the inner shroud rings. The vanes 83 are made of steel and are brazed to the inner shroud and pierced through the outer shrouds on the first five vane and shroud assemblies 83. The spacers separating assemblies are integral. The sixth stage does not provide spacing. However, this is furnished by the seventh stage located in the diffuser case 72.

2. Air Seals

The inside shroud of each row of vanes 83 has a steel ring, with a small step riveted to it on its inside face. Two knife-edge seals on each rotor spacer ride free of steps forming an air seal between the compressor stages.

3. Rear Compressor Rotor

The rotor shaft 65 includes seven rows of blades 84 on disks, two hubs, six spacer assemblies, sixteen tie-rod bolts with nuts and washers. A knife-edge seal ring is riveted to lip on the forward face of the tenth stage disk.

Each row of blades 84 is inserted into undercut slots in its disk. They are held in place by locks inserted under blades 84 and bent to secure. The blades 84 do not have a tight fit, but rather are seated by centrifugal force during engine operation.

4. Diffuser Section

The velocity of air as it leaves the rear compressor 70 is very high. This motion is both rearward and tangential around the engine. The exit guide vanes at the forward end of the diffuser case 72 convert tangential whirl into pressure energy. After the vanes, the high pressure air will have a large rearward velocity. The gradual increasing area of air flow passages provided by the case configuration of the diffuser 72 decreases the air flow velocity to suitable burning speed and increases the pressure.

III. AFT CENTER BODY

At the aft portion of the turbine, there is a center body 38 about which the exhaust gas is expelled. In the modified core engine 20, the center body 38 is extended rearwardly so that it projects rearwardly beyond the aft direct of the mixer 29.

A. Fan Air Ducts

The kit includes a bifurcated series of three ducts 26a, 26b and 26c; and 27a, 27b and 27c, respectively, on each side of the engine 20. The acoustically-treated ducts 26 and 27 extend from an engine fan air attachment 90 and terminate at the common nozzle 28.

1. General

The engine fan air collector consists of the two duct assemblies 26 and 27 on the side of the engine 20. Each duct assembly 26 and 27 has three interengaging duct sections 26a, 26b and 26c; and 27a, 27b and 27c, respectively, on each respective side of the engine 20. The bi-ducts 26a and 27a are constructed of bonded aluminum honeycomb, or composites and are interchangeable, right and left. Each duct assembly 26 and 27 is from front to rear: the forward bifurcated fan air duct 26a and 27a, hinged constant section fan air duct 26b and 27b, and transition section fan air duct 26c and 27c. All ducts can be of bonded aluminum honeycomb or composite material.

B. Forward Ducts, Constant Section Ducts and Transition Ducts

The collector system consists of the engine fan air ducting 26 and 27 and the engine turbine 75 and exhaust outlet section 129. During engine operation, the exhausted fan air from ducts 26 and 27 and the engine exhaust gases from outlet 129 join at the rear of the engine 20, into the common nozzle 28.

a. The forward bifurcated fan air ducts 26a and 27a are installed between the engine fan exit attachments 90 and the hinged constant section fan air ducts 26b and 27b. Each bifurcated duct 26a and 27a has a semicircular shape at the forward end 91 to match the shape of the exhaust from fan attachment 90. The ducts 26a and 27a are bolted to the aft face of the fan exit 90 and are contoured at the aft end 92 to fit the side of the engine 20. The aft end 92 of the ducts 26a and 27a are fastened to the hinged constant section fan air ducts 26b and 27b, respectively, with bolted channel assemblies, which clamp the ends of the ducts 26a and 26b together and 27a and 27b together. Splitter webs, preferably in the range of 3 to 6, and more preferably 5, are attached to the inner surface of each duct to direct the flow of air through the ducts 26 and 27 and to provide additional supporting strength.

b. The hinged constant section fan air ducts 26b and 27b are installed between the forward bifurcated fan air ducts 26a and 27a and the transition section fan air ducts 26c and 27c, respectively. The ducts 26b and 27b are contoured to fit the side of the engine at the compressor section 70. The ducts 26b and 27b are fastened to the aft end 92 of the forward bifurcated fan air ducts 26a and 27a and to the front end 93 of the transition section fan air ducts 26c and 27c, respectively, with bolted channel assemblies, two on each side. These channel assemblies are hinged at the top with pins. By removing the two bolts from the upper and lower end of each channel assembly, the ducts can be rotated outward and upward. Splitter webs, preferably in the range of 3 to 6, and more preferably 3, are mounted internally in each duct 26b and 27b to direct the flow of air through the duct and to provide additional strength.

c. The transition section fan air ducts 26c and 27c are installed between the hinged constant section fan air ducts 26b and 27b. The ducts 26c and 27c are contoured to fit the side of the engine 20 and are attached at the firewall 30a by three rods on each side. The ducts 26c and 27c are attached at the forward end 93 to the hinged constant section fan air ducts 26b and 27b with bolted channel assemblies which clamp the ends of the ducts 26b and 26c together, and 27b and 27c together. The aft end 94 of the transition section fan air ducts 26c and 27c are fastened to the common nozzle shroud 60 by means of bolts. Splitter webs, preferably in the range of 3 to 6, and more preferably 4, are mounted internally in each duct 26c and 27c to direct the flow of air through the duct and to provide additional supporting strength.

IV. COMMON NOZZLE

The common nozzle 28 allows the air from the fans 21 and 22 to enter and exit a chamber at the same time as the core exhaust gases from the exhaust outlet 129 from the core engine 20. It is this chamber which constitutes the common nozzle 28.

The core gas exhaust outlet 129 and fan gases from duct outlets 26c and 27c enter and exit the chamber of the common nozzle 28 at a predetermined nozzle exit size so as not to affect the performance of the engine 20.

The common nozzle 28 accepts a mixer 29 which allows mixing of gas from the core exhaust 20 and gases from the fans 21 and 22 for maximum benefit.

V. MIXER

The mixer means 29 in the common nozzle 28 directs fan air into the core exhaust gas flow path downstream of the core engine 20. The mixer 29 includes 12 to 18 circumferentially-spaced, axially and radially elongated lobes 33 and 32, respectively, which define alternating hot and cold chutes. The fan gas (cold) chutes 32 are on the outside where the fan bypass air is located and the turbine exhaust (hot) chutes 33 are aligned with the interior core where the hot core air flows. The mixer 29 is designed to blend fan air passing through fan ducts 26 and 27, with core exhaust gas emerging from the downstream low pressure turbine 75 of the core engine 20 from exhaust outlet 129. The mixer 29 provides the optimum mixing without adversely affecting the engine efficiency.

The mixer 29 has a plurality of alternating hot gas ducts 33 and cold gas ducts 32. Gas from the bypass ducts 26 and 27 enters into the cold gas ducts 32 which incline radially inward. The colder bypass gas is directed toward the central axis of the engine 20. Exhaust gas from the core of the engine 20 flows through the hot gas ducts 33 which have a greater cross-section and which incline slightly outward in a radial direction. The hot and cold (primary and fan) gas mix downstream of the mixer 29 with the result that the temperature of the mixed gas is less than that of the core gas from exhaust 129. This decrease in temperature results in decrease in noise, since the noise is a function of the maximum gas temperature exiting the engine tail pipe 42.

VI. MIXER ADAPTER RING—SPACER—TRANSITION RING

A. Mixer Installation In Common Nozzle

The mixer 29 is installed within the common nozzle 28 by using an adapter ring 36 which is attached to a flange at the end of the engine 20 and extends downstream of the hot and cold gases. This causes laminar flow air to enter the mixing chamber of the mixer 28 at the proper angle and facilitate the objective of mixing by positioning the mixer at a location where fan air is introduced in a full annular flow. The mixing chamber is defined as the area of the lobes 32 and 33 of the mixer 29. The downstream end of the ring 36 is attached to the mixer 29 and ends at about the position where lobes 32 and 33 begin.

VII. MIXER TRANSITION CONTOUR PLATE (FAIRING)—FAN EXHAUST DUCT SEGMENT

The aerodynamic streamlining of the mixer fan stream is achieved with a circular transition contour plate 37. This transition contour plate 37 is for initially directing the fan air into the cold chutes 32 of the mixer 29. The plate 37 is attached to another contour plate 34 by the use of mechanical screws. The contour plates 37 and 34 provide laminar flow air through the downstream position to the mixer 29.

The contour plate 37 and 34 has the same function as a fairing. The plate 34 does not have any of the formed bosses other mixers require, but is a formed smooth annular plate 34 attached to the upstream end of the mixer 29 by mechanical screws.

VIII. FAN AIR SHROUD

A fan air shroud 60 is located at the position downstream from the aft end 94 of the transition ducts 26c and 27c. This shroud 60 engages the outside perimeter 100 of the aft end 94 of duct 26c and 27c and thereby acts to assist the transition of the fan air from ducts 26 and 27 into the common nozzle 28. The shroud 60 extends around the mixer 29, and about the mixer adapter ring and about the contour plate.

The contour plate, or fairing 37 and 34, provides a smooth air cover for the mixer 29 attack angle thereby providing laminar air flow.

IX. THRUST REVERSER

A. Mounting Ring, Adapter, Spacer—Exhaust Transition Duct Assembly

The kit comprises an aerodynamic transition ring 122 from the rear outer flange of the fan air shroud 60 of the common nozzle 28 of the engine 20. The shroud 60 permits proper gas path contours for mixer 29 and engine 20 performance. The thrust reverser ring 121 is mounted together with the ring 122.

B. Target-Type Thrust Reverser

The thrust reverser is a four-bar link 47 and 48, target-type system. Opposing doors 43 and 44 are rotated into position to block and divert the flow of exhaust gases from the primary nozzle 46 (located downstream from the mixer 29) by means of direct mechanical linkage to a hydraulic actuation system.

Two sets of linkage 47, 48 and 48a are employed for each thrust reverser door 43 and 44. Each set 47, 48 and 48a consists of three types of links: (i) a "driver" link 48 that imparts motion to the door, (ii) an "idler" link 47 that holds the door in alignment, and (iii) an "over-center" link 48a that connects the driver link 48 to the actuator 50, and provides the necessary mechanical advantage for deploying or stowing the system.

C. Thrust Reverser: Structural Description

The thrust reverser assembly serves two purposes: (i) in the stowed position, the reverser doors act as aerodynamic fairings for the nacelle afterbody 45, and (ii) in the deployed mode, the doors 43 and 44 divert the flow of gases from the primary nozzle 46 to achieve thrust reversal. The stangs 102 and 103 are located on the top and bottom of the tail pipe assembly 42.

Movement of the reverser mechanical system is accomplished by a pair of actuators 50 mounted in box stang structures 102 and 103 attached to the trailing portion of the nozzle 46. The "bird cage" fittings, also mounted from these structures, provide support for the translating carriage guide rods and pivot points for the thrust reverser linkages 47 and 48. Actuation forces are transmitted by the carriages to the overcenter links 48a, and then to the driver links 48.

Applied reverser loads are carried through the nozzle assembly into the common nozzle 28, and reacted at the engine exhaust flange.

X. COWLING

A. General

1. The forward and aft cowling sections 110 and 111, attach together around the outer diameter of the engine 20 to form a completely enclosed nacelle 112. This provides protection for the exterior of the engine 20 and accessories, and provides a smooth, unrestricted airflow around the engine 20 during flight. The cowling consists of the nose cowl 52, inlet bullet 51, cowl doors 110, and aft cowl doors 111. The thrust reverser 41 completes the nacelle afterbody 45 of the engine 20.

2. The pylon apron 115 completes the upper portion of the cowling and provides the attach points for the forward cowl doors 110 and the aft cowl door 111.

B. Nose Cowl

The nose cowl 52 is the foremost section of the cowling and attaches directly to the engine inlet flange 113. The leading edge 114 contains a duct which directs engine anti-icing air around the inside of the nose cowl 52.

The kit incorporates an acoustically-treated, enlarged and extended nose cowl 52 in the range of about 42" to 52", and more preferably about 48", with a bonded all-metal or composite, fail-safe construction. The nose cowl 52 has an enlarged intake area to accommodate the largest engine of this type. The inlets are acoustically treated by the use of sound-deadening material to the interior surface of the nose cowl 52. This material is added to attenuate forward-projected turbo-machinery noise and serves to reduce noise during the operation of the engine 20.

XI. TAIL PIPE ASSEMBLY

The noise suppression kit further includes a modified tail pipe assembly 42 which is configured to have a greater cross sectional area in the exit plane so as to accommodate increased volume in the flow stream caused by introduction of the various components primarily the mixer within the gas flow path. The assembly 42 includes the nozzle assembly 46 in which there is the barrel nozzle 49, and at its exit end there is the nozzle 31.

XII. INLET BULLET: CENTER BODY

The inlet bullet 51, having a length in the range of about 36" to 40", and more preferably about 38.35", when installed on the engine inlet accessory drive case flange, provides smooth airflow into the engine compressor 66 and protects accessories installed on the accessory drive case. The $N_1$ tachometer generator and the $P_{t2}$ inlet pressure sensing probe 200 are housed in the inlet bullet 51, as shown in FIG. 3. Suitable plumbing lines 201 transfer the sensed pressure to a bleed valve 202. This inlet pressure sensing probe $P_{t2}$ 200 is housed in an inlet bullet 51 forwardly of the fans 21.

Alternatively, as shown in FIG. 3A, there is an inlet pressure sensing probe $P_{t2}$ 203 housed at a location of an inlet guide vane 55 forwardly of the fans 21. The probe 203 is shaped for aerodynamic location in the inlet guide vane 55. The aerodynamic shape is illustrated in FIG. 3B and includes a width 204 relatively narrower than a length 205 of the probe. The width 204 determined in a direction transverse the air flow, and the length 205 is in a direction longitudinal to the air flow. A suitable mounting adapter 206 affixes the probe 203 in position. The probe 206 has an outlet 207 for connection with the plumbing 201. The outside surface of the probe 203 in a longitudinal direction is substantially curved in an aerofoil type effect.

The axial flow front fan 21 is axially separated from the inlet guide vane 55 is extended relatively forwardly.

The kit incorporates a newly-designed and lengthened center center body acoustically treated with a bonded all-metal, fail-safe construction. The center body is designed for the inlet size and shaped to accommodate inlet flow angles. The center body is light bulb-shaped and acoustically treated by sound-deadening material to the exterior surface 116. This material is added to attenuate turbo machinery noise and serves to reduce noise during the operation of the engine.

XIII. RESPACED INLET GUIDE VANE (RIGV)

The noise reduction kit includes components which respace the engine inlet guide vane 55 several inches forward. This allows more space between the rotating face of fan blade 21 and the fixed inlet guide vane 55.

This relocation of the fixed guide vane 55 in relation to the rotating fan blade 21 eliminates the siren effect and reduces the noise levels. An acoustically-treated duct 117 is inserted between the forward end of the front compressor 66 and the trailing end of the inlet guide vane 55.

XIV. GENERAL

Many other forms of the invention exist, each differing from others in matters of detail only.

By this invention, the noise from the JT3D engine is considerably reduced by many decibels. The bypass ducts lead fan air to a common nozzle, which provides a first level of noise reduction. Other factors of noise reduction are provided in part by the bleed valve diversion to the common nozzle.

One or more of the noise-reducing features can be omitted. Thus, the noise attenuation features of the cowling and inlet bullet may be omitted in some situations. In some cases, there is a mixer in the common nozzle, whereas, in different cases, the mixer is omitted.

In some other cases the RIGV is omitted and the material layer is applied with the relatively normal spacing of the vanes. Similarly the RIGV is optional in the relocation of the pressure inlet $P_{t2}$ probe, or the use of an aerodynamically suitable probe.

The invention is generally directed to providing a common nozzle for the JT3D family of engines to thereby reduce noise, while at the same time the engine retains satisfactory operating conditions. This had never previously been achieved or considered possible.

The invention is to be determined solely in terms of the following claims.

What is claimed is:

1. A noise-reduced turbofan engine comprising:
   a) a core engine having axial flow fans, multi-stage compressors and multi-stage reaction turbines and a thrust of at least about 18,000 lbs. at sea level, the fans being at an upstream end of the core engine for generating axial fan air flow;
   b) bypass ducts for receiving at least portion of the axial fan air flow from the fans, the ducts terminating at a common nozzle located at the outlet for exhaust gas from the engine, the common nozzle having a mixing plane area for each of the fan air flow and for the exhaust gas in a range between 700 and 800 square inches; and
   c) a material layer located in a spacing between a tip of blades for at least some of the fans and a duct for the fans, thereby to reduce a normal clearance between the tip of blades for the fan and the duct.

2. An engine as claimed in claim 1 wherein the layer is located about the inside wall of the duct.

3. An engine as claimed in claim 1 wherein the layer is located about the inside wall of the duct to a thickness of between about 0.80 to about 0.90 of an inch.

4. An engine as claimed in claim 2 wherein the layer is located about the inside wall of the duct to a thickness of between about 0.050 to about 0.090 of an inch.

5. A noise-reduced turbofan engine comprising:
   a) a core engine having axial flow fans, multi-stage compressors and multi-stage reaction turbines and a thrust of at least about 18,000 lbs. at sea level, the fans being at an upstream end of the core engine for generating axial fan air flow;
   b) bypass ducts for receiving at least portion of the axial fan air flow from the fans, the ducts terminating at a common nozzle located at the outlet for exhaust gas from the engine, the common nozzle having a mixing plane area for each of the fan air flow and for the exhaust gas in a range between 700 and 800 square inches; and
   c) an inlet pressure sensing probe housed in an inlet bullet forwardly of the fans.

6. A noise-reduced turbofan engine comprising:
   a) a core engine having axial flow fans, multi-stage compressors and multi-stage reaction turbines and a thrust of at least about 18,000 lbs. at sea level, the fans being at an upstream end of the core engine for generating axial fan air flow;
   b) bypass ducts for receiving at least portion of the axial fan air flow from the fans, the ducts terminating at a common nozzle located at the outlet for exhaust gas from the engine, the common nozzle having a mixing plane area for each of the fan air flow and for the exhaust gas in a range between 700 and 800 square inches; and
   c) an inlet pressure sensing probe housed at a location of an inlet guide vane forwardly of the fans, the probe being located in the inlet guide vane.

7. An engine as claimed in claim 6 wherein an aerodynamic shape includes a width relatively narrower than a length of the probe, the width being determined in a direction transverse the air flow and the length in a direction longitudinal to the air flow.

8. A noise-reduced turbofan engine comprising:
   a) a core engine having axial flow fans, multi-stage compressors and multi-stage reaction turbines and a thrust of at least about 18,000 lbs. at sea level, the fans being at an upstream end of the core engine for generating axial fan air flow;
   b) bypass ducts for receiving at least portion of the axial fan air flow from the fans, the ducts terminating at a common nozzle located at the outlet for exhaust gas from the engine, the common nozzle having a mixing plane area for each of the fan air flow and for the exhaust gas in a range between 700 and 800 square inches; and
   c) a material layer located about the inside wall of the duct in a spacing between a tip of blades for at least some of the fans and a duct for the fans, thereby to reduce a normal clearance between the tip of blades for the fan and the duct, the thickness of the layer being between about 0.050 to about 0.090 of an inch.

9. An engine as claimed in claim 1 including an inlet pressure sensing probe housed at a location of an inlet guide vane forwardly of the fans, the probe being located in the inlet guide vane.

10. An engine as claimed in claim 1 including an inlet pressure sensing probe housed in an inlet bullet forwardly of the fans.

11. An engine as claimed in claim 10 wherein the inlet bullet centerbody has a length of about 36 to about 40", and has a lead end being shaped to be substantially hemispherical.

12. An engine as claimed in claim 5 including an inlet cowling with a relatively increased diameter inlet cowling, and having a length of about 42" to about 52".

13. An engine as claimed in claim 1 wherein there are two fans relatively spaced from each other and the axial flow front fan is axially separated by an amount equal approximately to the axial depth of the blades of the fans and wherein an inlet guide vane for the fans is extended relatively forwardly.

14. A noise-reduced turbofan engine comprising:
   a) a core engine having axial flow fans, multistage compressors and multistage reaction turbines, and a thrust of at least about 18,000 lbs. at sea level, the fans being at an upstream end of the core engine for generating axial fan air flow;
   b) bypass ducts for receiving at least portion of the axial fan air flow from the fans, the ducts terminating at a common nozzle located at the outlet for exhaust gas from the engine, the common nozzle having a mixing plane area for each of the fan air flow and for the exhaust gas in a range between 700 and 800 square inches;
   c) a mixer in the common nozzle disposed axially to receive and exhaust the exhaust gas and fan air, said mixer having an upstream end and an annular mixer wall axially extending downstream therefrom, the wall being formed into a plurality of circumferentially alternating radially inward and radially outward lobes, the radially inward lobes defining cold chutes for radially inwardly diverting fan air and outward lobes defining hot chutes for permitting radially outward expansion of exhaust gas; and
   d) a material layer located in a spacing between a tip of blades for at least some of the fans and a duct for the fans, thereby to reduce a normal clearance between the tip of blades for the fan and the duct.

15. An engine as claimed in claim 14 including an inlet pressure sensing probe housed in an inlet bullet forwardly of the fans.

16. An engine as claimed in claim 14 including an inlet pressure sensing probe housed at a location of an inlet guide vane forwardly of the fans, the probe being located in the inlet guide vane.

17. An engine as claimed in claim 14 wherein the mixing plane area for the cold air is in the range of about 750 to 780 square inches, and about 752 square inches, and the plane area for the hot air is about 725 to 760 square inches, and preferably about 727 square inches.

18. An engine as claimed in claim 14 including an acoustically dampened nose cone for coaxial attachment to an upstream end of the core engine, the nose cone having a lead end being shaped to be substantially hemispherical.

19. An engine as claimed in claim 14 wherein there are two fans relatively spaced from each other and the axial flow front fan is axially separated by an amount equal approximately to the axial depth of the blades of the fans and wherein an inlet guide vane for the front fan is extended about 3" to about 5" relatively forward.

* * * * *